UNITED STATES PATENT OFFICE.

ROBERT E. SCHMIDT, OF ELBERFELD, GERMANY, ASSIGNOR TO THE FARBEN-FABRIKEN OF ELBERFELD COMPANY, OF NEW YORK, N. Y.

GREEN DYE DERIVED FROM QUINIZARIN.

SPECIFICATION forming part of Letters Patent No. 599,427, dated February 22, 1898.

Application filed October 4, 1897. Serial No. 653,929. (No specimens.) Patented in Germany October 14, 1894, No. 84,509; in France December 3, 1894, No. 243,316; in England December 8, 1894, No. 23,927, and in Italy December 31, 1894, XXIX, 37,890, and LXXIV, 206.

*To all whom it may concern:*

Be it known that I, ROBERT E. SCHMIDT, chemist, doctor of philosophy, residing at Elberfeld, Germany, (assignor to the FARBENFABRIKEN OF ELBERFELD COMPANY, of New York,) have invented a new and useful Improvement in the Manufacture of Green Anthraquinone Dye, (for which the Farbenfabriken, vormals Fr. Bayer & Co., of Elberfeld, Germany, has already obtained Letters Patent in Germany, No. 84,509, dated October 14, 1894; in England, No. 23,927, dated December 8, 1894; in France, No. 243,316, dated December 3, 1894, and in Italy, Reg. Gen., Vol. 29, No. 37,890, Reg. Att., Vol. 74, No. 206, dated December 31, 1894;) and I do hereby declare the following to be an exact and clear description of my invention.

In another application bearing the same date, Serial No. 653,928, I have described a process for producing monosulfo-acids of bodies of the following general formula:

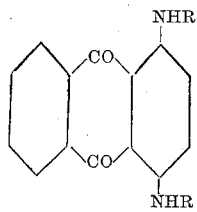

(R representing in this formula an aromatic radical, such as phenyl, tolyl, xylyl, naphthyl, or the like,) which process consists in a cautious sulfonation of the said bodies.

My present invention relates to the production of another class of dyestuffs, which are disulfo-acids of the above-defined bodies, by treating the said bodies with more energetic sulfonating agents than in the process above referred to—for instance, with weakly-fuming sulfuric acid. The disulfo-acids thus obtained exhibit chemical and dyeing properties similar to those of the above-mentioned monosulfo-acids. They are distinguished from the latter especially by the fact that they dissolve with a greater readiness in water.

In carrying out my new process practically I can proceed as follows: Ten parts of the condensation product from quinizarin and paratoluidin having most probably the formula:

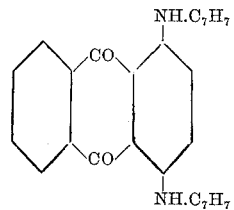

are dissolved in one hundred parts of fuming sulfuric acid containing five per cent. of $SO_3$. After allowing the resulting solution to stand for some time at ordinary temperature the sulfonation is performed. The same can be quickened by carefully heating the liquid to from 50° to 70° centigrade. The reaction will be finished if two subsequent test portions poured into concentrated sulfuric acid are found to yield the same bluish-green solution. At this stage the reaction mixture is poured into fifteen hundred liters of cold water. The dyestuff which is precipitated from the resulting solution by the addition of common salt is filtered off, pressed, and dried.

Of course the new dyestuff can also be produced by carefully sulfonating the monosulfoacid described in the above-mentioned specification.

When dry and pulverized, my new product represents a dark-green powder, easily soluble in cold water with a green color, which is not changed on the addition of acids or alkalies. On adding an excess of hydrochloric or sulfuric acid to the watery solution the dyestuff is partially precipitated. It dissolves in alcohol with a bluish-green color, in chloroform and acetone with a green color, and is difficultly soluble in benzene. By pure concentrated sulfuric acid it is dissolved with a bluish-green color, which turns into green on the addition of water.

If to a watery solution of the dyestuff, acidulated by means of a small quantity of acetic acid, zinc-dust is gradually added, a leuco derivative of the dyestuff is formed which can be recognized from the fact that the color of the solution changes from green into yellow. On exposing the yellow solution when filtered to the oxidizing action of the air it soon reassumes the original green color. If, however, a small quantity of sulfuric acid is added to the said yellow solution and the latter is then heated, the dyestuff molecule is split, quinizarin hydrid being formed, which separates in the shape of fine needles.

The new coloring-matter dyes unmordanted wool in acid-baths green shades, which exhibit a great fastness to light, to the air, to acids, and to alkalies.

Having now described my invention and in what manner the same is to be performed, what I claim as new, and desire to secure by Letters Patent, is—

1. The process for producing new anthraquinone dyestuffs being disulfo-acids of the condensation product from one molecule of quinizarin and two molecules of a primary aromatic amin, having most probably the general formula:

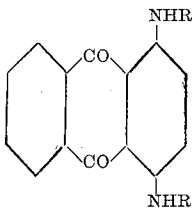

R representing in this formula an aromatic radical such as phenyl, tolyl, xylyl, naphthyl or the like, which process consists in sulfonating the said condensation products by agents of sulfonation, such as fuming sulfuric acid, containing five per cent. of $SO_3$, introducing the reaction mixture into cold water and precipitating the formed dyestuff from the resulting solution by the addition of common salt, substantially as described.

2. The process for producing a new anthraquinone coloring-matter, being a disulfo-acid of the condensation product obtainable from one molecule of quinizarin and two molecules of paratoluidin, having most probably the formula:

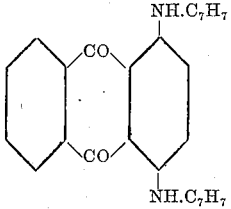

which process consists in sulfonating the said body by fuming sulfuric acid, containing five per cent. of $SO_3$, introducing the reaction mixture into cold water and precipitating the formed dyestuff from the resulting solution by the addition of common salt, substantially as described.

3. As new articles of manufacture the new anthraquinone dyestuffs obtainable by sulfonation of the products of condensation from one molecule of quinizarin and two molecules of a primary aromatic amin, being disulfo-acids of a body having most probably the general formula:

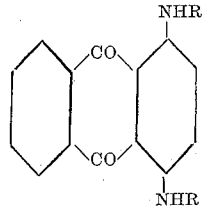

in which formula R represents an aromatic radical, such as phenyl, tolyl, xylyl, naphthyl or the like, representing when dry and pulverized dark powders, soluble in water with a green color, dyeing wool in acid-baths green shades which are fast to light, acids and alkalies, substantially as described.

4. As a new article of manufacture the specific anthraquinone dyestuff obtainable by sulfonation of the condensation product of one molecule of quinizarin and two molecules of paratoluidin, being a disulfo-acid of the anthraquinone compound of the formula:

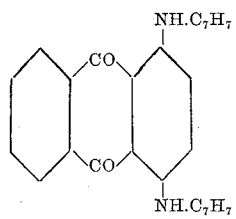

representing when dry and pulverized a green powder soluble in water with a green color which changes into yellow on acidulating and adding zinc-dust, this solution when filtered reassuming the original green color on exposure to the air and separating fine needles of quinizarin hydrid after heating with a small quantity of sulfuric acid, soluble in alcohol with a bluish-green color, in chloroform and acetone with a green color, in concentrated sulfuric acid with a bluish-green color which changes into green on the addition of water, dyeing unmordanted wool in acid-baths green shades which exhibit a great fastness to light, to the air, to acids and alkalies.

In testimony whereof I have signed my name in the presence of two subscribing witnesses.

ROBERT E. SCHMIDT.

Witnesses:
R. E. JAHN,
OTTO KÖNIG.